US012614096B2

(12) United States Patent
Nikolic et al.

(10) Patent No.: US 12,614,096 B2
(45) Date of Patent: Apr. 28, 2026

(54) ANOMALY SCORE NORMALISATION BASED ON EXTREME VALUE THEORY

(71) Applicant: Oracle International Corporation, Redwood Shores, CA (US)

(72) Inventors: Marija Nikolic, Zurich (CH); Matteo Casserini, Zurich (CH); Arno Schneuwly, Effretikon (CH); Nikola Milojkovic, Dietikon (CH); Milos Vasic, Zurich (CH); Renata Khasanova, Zurich (CH); Felix Schmidt, Baden-Dattwil (CH)

(73) Assignee: Oracle International Corporation, Redwood Shores, CA (US)

( * ) Notice: Subject to any disclaimer, the term of this patent is extended or adjusted under 35 U.S.C. 154(b) by 922 days.

(21) Appl. No.: 17/745,103

(22) Filed: May 16, 2022

(65) Prior Publication Data

US 2023/0368054 A1 Nov. 16, 2023

(51) Int. Cl.
*G06N 7/01* (2023.01)
*G06N 20/00* (2019.01)

(52) U.S. Cl.
CPC ............... *G06N 7/01* (2023.01); *G06N 20/00* (2019.01)

(58) Field of Classification Search
CPC .......... G06N 7/01; G06N 20/00; G06N 3/047; G06N 5/01; G06N 20/10; G06N 20/20; G06N 3/0455; G06N 3/084; G06N 3/088
See application file for complete search history.

(56) References Cited

U.S. PATENT DOCUMENTS

| | | | |
|---|---|---|---|
| 10,069,900 B2 | 9/2018 | Poola et al. | |
| 10,270,788 B2 * | 4/2019 | Faigon | G06N 20/00 |
| 2014/0108314 A1 | 4/2014 | Chen | |
| 2018/0095004 A1 * | 4/2018 | Ide | G06N 7/01 |
| 2020/0045064 A1 * | 2/2020 | Bindal | G06N 20/00 |

(Continued)

OTHER PUBLICATIONS

Gao et al. ("Converting Output Scores from Outlier Detection Algorithms into Probability Estimates," Sixth International Conference on Data Mining (ICDM'06), Hong Kong, China, 2006, pp. 212-221) (Year: 2006).*

(Continued)

*Primary Examiner* — Imad Kassim
(74) *Attorney, Agent, or Firm* — Hickman Becker Bingham Ledesma LLP

(57) ABSTRACT

The present invention relates to threshold estimation and calibration for anomaly detection. Herein are machine learning (ML) and extreme value theory (EVT) techniques for normalizing and thresholding anomaly scores without presuming a values distribution. In an embodiment, a computer receives many unnormalized anomaly scores and, according to peak over threshold (POT), selects a highest subset of the unnormalized anomaly scores that exceed a tail threshold. Based on the highest subset of the unnormalized anomaly scores, parameters of a probability density function are trained according to EVT. After training and in a production environment, a normalized anomaly score is generated based on an unnormalized anomaly score and the trained parameters of the probability density function. Anomaly detection compares the normalized anomaly score to an optimized anomaly threshold.

17 Claims, 7 Drawing Sheets

(56) References Cited

U.S. PATENT DOCUMENTS

| | | | | |
|---|---|---|---|---|
| 2020/0210393 | A1* | 7/2020 | Beaver | G06F 16/2474 |
| 2021/0328969 | A1* | 10/2021 | Gaddam | H04L 63/102 |
| 2022/0188694 | A1 | 6/2022 | Suzani et al. | |

OTHER PUBLICATIONS

Bourguignon et al. ("The Kumaraswamy Pareto distribution", arXiv, 2012) (Year: 2012).*

Siffer et al. ("Anomaly Detection in Streams with Extreme Value Theory", KDD 2017 Research Paper) (Year: 2017).*

Zhao et al. ("Anomaly Detection with Score functions based on Nearest Neighbor Graphs", 2009) (Year: 2009).*

Qian et al. ("A Rank-SVM Approach to Anomaly Detection", A New One-Class Svm for Anomaly Detection, 2014) (Year: 2014).*

Yao et al., "Rethinking Class-Prior Estimation for Positive-Unlabeled Learning", in International Conference on Learning Representations, dated Sep. 28, 2021, 12 pages.

Perini et al., "Class Prior Estimation in Active Positive and Unlabeled Learning", in Proceedings of the 29th IJCAI and the 17th PRICAI, dated Jul. 2020, 7 pages.

Kriegel at al., "Interpreting and Unifying Outlier Scores", in Proceedings of the 2011 SIAM International Conference on Data Mining, dated 2011, 12 pages.

Christoffel et al., "Class-prior Estimation for Learning from Positive and Unlabeled Data", Asian Conference on Machine Learning, PMLR, vol. 45, dated Feb. 2016, 16 pages.

Eskin, Eleazar, "Anomaly Detection Over Noisy Data Using Learned Probability Distributions", https://academiccommons.columbia.edu/doi/10.7916/D8C53SKF, dated 2000, 8 pages.

An et al., "Variational Autoencoder Based Anomaly Detection Using Reconstruction Probability", SNU Data Mining Center, Special Lecture on IE 2.1 (2015), http://dm.snu.ac.kr/static/docs/TR/SNUDM-TR-2015-03.pdf, dated Dec. 27, 2015, 18 pages.

Angiulli et al., "Distance-Based Detection and Prediction of Outliers", IEEE Transactions on Knowledge and Data Engineering, vol. 18, No. 2, dated Feb. 2006, 16 pages.

Batt et al., "Extreme Events in Lake Ecosystem Time Series", Limnology and Oceanography Letters, vol. 2, No. 3, doi: 10.1002/lol2.10037, dated Feb. 2017, 7 pages.

Breunig et al., "LOF: Identifying Density-Based Local Outliers", Proceedings of the 2000 ACM SIGMOD International Conference on Management of Data, https://dl.acm.org/doi/pdf/10.1145/342009.335388, dated 2000, 12 pages.

Chakraborty et al., "Early detection of faults in HVAC systems using an XGBoost model with a dynamic threshold", Energy and Buildings, dated 2019, pp. 326-344.

Chalapathy et al., "Deep Learning for Anomaly Detection: A Survey", https://arxiv.org/pdf/1901.03407.pdf%20http://arxiv.org/abs/1901.03407.pdf, dated Jan. 24, 2019, 50 pages.

Chandola et al., "Anomaly Detection: A Survey", ACM Computing Surveys (CSUR) vol. 41, No. 3, https://conservancy.umn.edu/bitstream/handle/11299/215731/07-017.pdf?sequence=1, dated Aug. 15, 2007, 74 pages.

Chang et al., "A Dynamic Threshold Decision System for Stock Trading Signal Detection", Applied Soft Computing 11, dated 2011, 13 pages.

Davis et al., "LSTM-Based Anomaly Detection: Detection Rules from Extreme Value Theory", EPIA Conference on Artificial Intelligenc https://arxiv.org/pdf/1909.06041.pdf, dated Sep. 13, 2019, 12 pages.

Agarwal, Deepak, "An Empirical Bayes Approach to Detect Anomalies in Dynamic Multidimensional Arrays", Fifth IEEE International Conference on Data Mining (ICDM'05), dated 2005, 9 pages.

Dykes, Sandra, "Poster: An Extreme Value Theory Approach to Anomaly Detection (EVT-AD)", https://www.ieee-security.org/TC/SP2012/posters/An%20Extreme%20Value%20Theory%20Approach.pdf, dated 2012, 2 pages.

Tippett et al., "More Tornadoes in the Most Extreme U.S. Tornado Outbreaks", https://www.science.org/doi/epdf/10.1126/science.aah7393, dated Oct. 2016, 6 pages.

Haan et al., "Extreme Value Theory: An Introduction", vol. 21, New York: Springer, DOI:10.1007/0-387-34471-3, dated Jan. 2006, 15 pages.

Jain et al., "Score normalization in multimodal biometric systems", Pattern Recognition 38, dated Jan. 2005, 16 pages.

Kratz et al., "The QQ—Estimator and Heavy Tails", Stochastic Models, vol. 12, No. 4, https://ecommons.cornell.edu/bitstream/handle/1813/9004/TR001122.pdf, dated Jan. 1995, 25 pages.

Le Cam, Lucien, "Maximum Likelihood: An Introduction", International Statistical Review/Revue Internationale de Statistique, vol. 58, No. 2, http://www.jstor.org/stable/1403464, dated Aug. 1990, 20 pages.

Massey Jr, Frank, "The Kolmogorov-Smirnov Test for Goodness of Fit", Journal of the American Statistical Association vol. 46, No. 253, https://www.jstor.org/stable/2280095, dated Mar. 1951, 12 pages.

Rocco, Marco, "Extreme Value Theory for Finance: A Survey", Journal of Economic Surveys, vol. 28, No. 1, http://citeseerx.ist.psu.edu/viewdoc/download?doi=10.1.1.650.8776&rep=rep1&type=pdf, dated Jul. 2011, 74 pages.

Rudd et al., "The Extreme Value Machine", IEEE Transactions on Pattern Analysis and Machine Intelligence, vol. 40, No. 3, https://ieeexplore.ieee.org/ielaam/34/8281092/7932895-aam.pdf, dated Mar. 2017, 8 pages.

Siffer et al., "Anomaly Detection in Streams with Extreme Value Theory", Proceedings of the 23rd ACM SIGKDD International Conference on Knowledge Discovery and Data Mining, https://hal.archives-ouvertes.fr/hal-01640325, dated Nov. 20, 2017, 10 pages.

Singh et al., "Quantitative Evaluation of Normalization Techniques of Matching Scores in Multimodal Biometric Systems", Springer-Verlag Berlin Heidelberg, dated 2007, 10 pages.

Dong et al., "Quality-Based Dynamic Threshold for Iris Matching", IEEE, dated 2009, 4 pages.

Neuberg, Richard, et al., "Detective Relative Anomaly", 2015 18th Intl Conf, on Mach Learning and Data Mining in Pattern Recognition, Lecture Notes in Computer Science, LNAI 10358. Springer, doi.org/10.1007/978-3-319-62416-7_9, Jul. 2, 2017, 15pgs.

Gao, Jing, et al., "Converting Output Scores from Outlier Detection Algorithms into Probability Estimates", 6th Intl Conf on Data Mining (ICDM'06), pp. 212-221, doi: 10.1109/ICDM.2006.43, Dec. 18, 2006, 10pgs.

* cited by examiner

FIG. 2

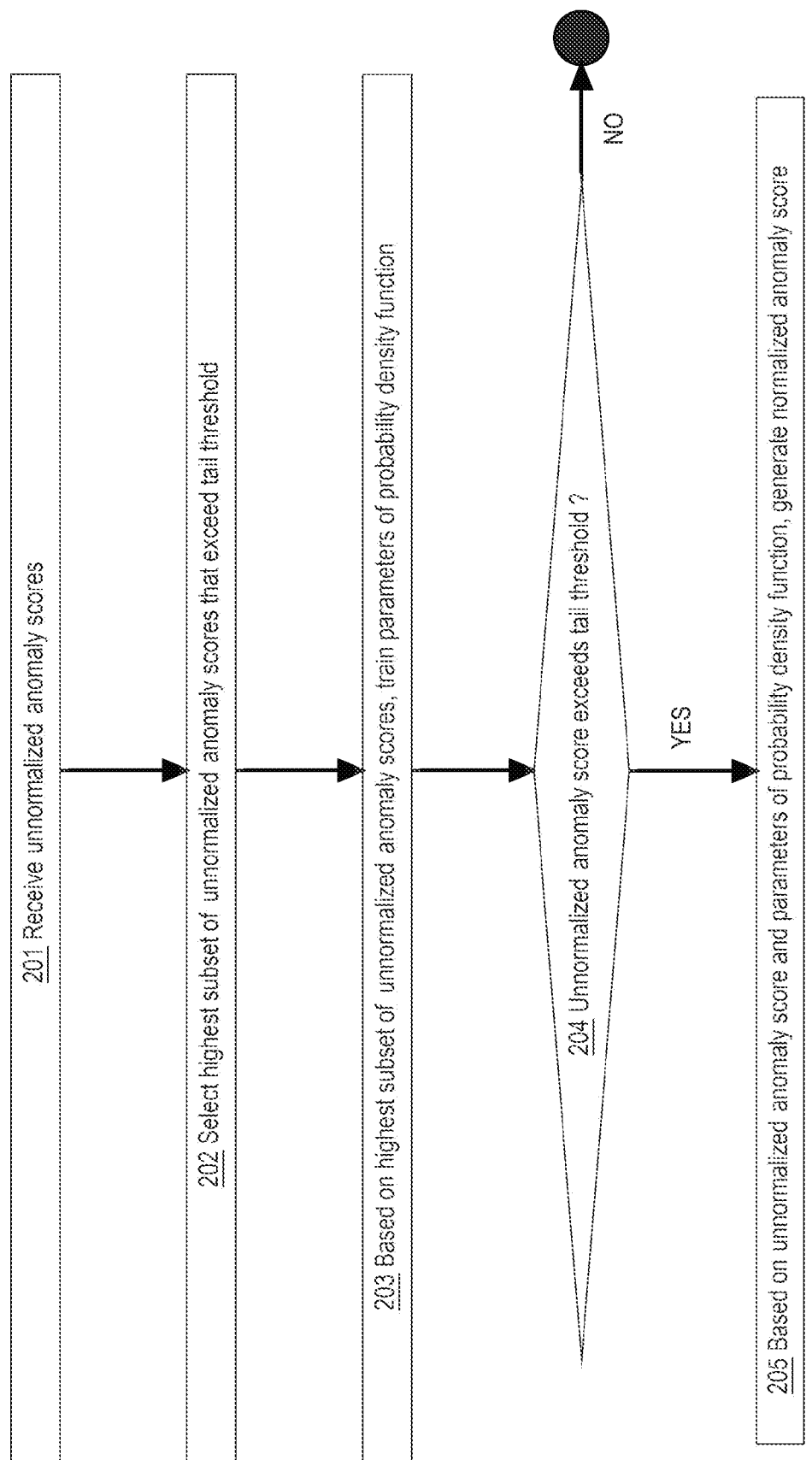

201 Receive unnormalized anomaly scores

202 Select highest subset of unnormalized anomaly scores that exceed tail threshold 203 Based on highest subset of unnormalized anomaly scores, train parameters of probability density function 204 Unnormalized anomaly score exceeds tail threshold ?

NO

YES

205 Based on unnormalized anomaly score and parameters of probability density function, generate normalized anomaly score 302 Based on maximum likelihood estimating and probability density function, train parameters 304 Based on trained parameters, configure cumulative density function 306 Calculate normalized anomaly score by applying cumulative density function with trained parameters to unnormalized anomaly score

FIG. 4

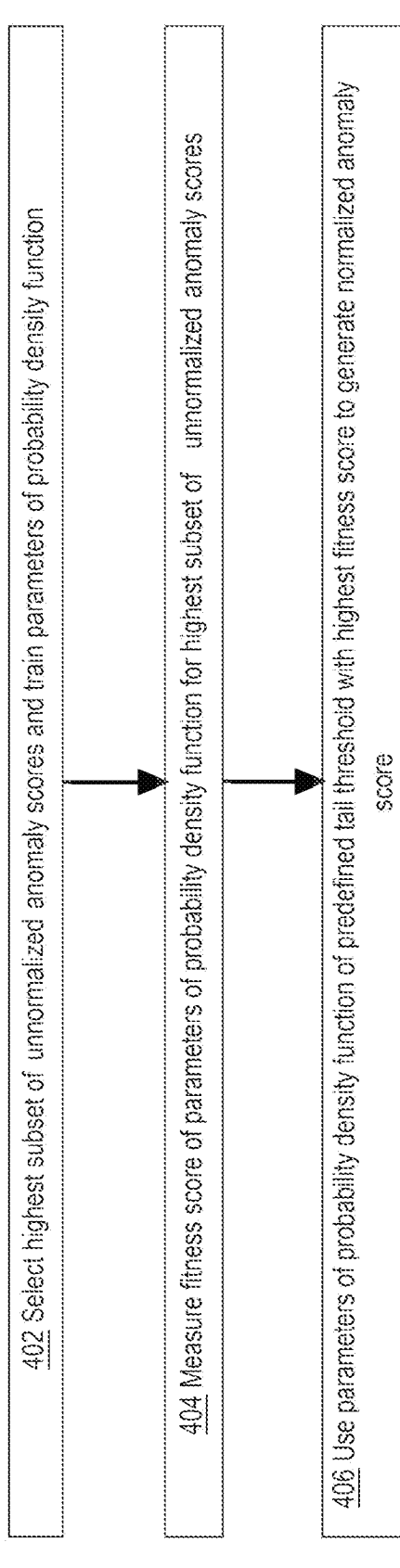

402 Select highest subset of unnormalized anomaly scores and train parameters of probability density function 404 Measure fitness score of parameters of probability density function for highest subset of unnormalized anomaly scores 406 Use parameters of probability density function of predefined tail threshold with highest fitness score to generate normalized anomaly score 502 Unsupervised train anomaly scoring model without anomaly threshold 504 Populate feature vectors with domain specific features 506 Generate unnormalized anomaly scores by applying anomaly scoring model to feature vectors

SOFTWARE SYSTEM 700

702

APPLICATION PROGRAM 1 — 702A

APPLICATION PROGRAM 2 — 702B

APPLICATION PROGRAM 3 — 702C

[...]

APPLICATION PROGRAM N — 702N

OPERATING SYSTEM
(e.g., WINDOWS, UNIX, LINUX, MAC OS, IOS, ANDROID, OR LIKE) — 710

GRAPHICAL USER INTERFACE (GUI) — 715

VIRTUAL MACHINE MONITOR (VMM) — 730

BARE HARDWARE (e.g., COMPUTING DEVICE 600)

ANOMALY SCORE NORMALISATION BASED ON EXTREME VALUE THEORY

FIELD OF THE INVENTION

The present invention relates to threshold estimation and calibration for anomaly detection. Herein are machine learning (ML) and extreme value theory (EVT) techniques for normalizing and thresholding anomaly scores without presuming a values distribution.

BACKGROUND

Anomaly detection has attracted considerable attention in industry due to its importance in defending computer systems from harmful activities, whether malicious or accidental. Databases are prone to various kinds of attacks and malicious activities. Machine learning (ML) algorithms that analyze database logs play an important role in detecting such activities. Logs represent structured sequences of data composed of messages, where each message is composed of attributes.

Many anomaly detection approaches rely on predefined thresholds that are usually subjectively selected by a human expert, or automatically selected based on assumptions about statistical distributions of data. In case of incorrect threshold selection or distributional assumptions, anomaly detection accuracy can significantly deteriorate.

Anomaly detection is not always based on ML models that calculate anomaly scores. Some approaches directly use raw data without any transformation. In any case, anomaly detection is typically performed by comparing anomaly scores or raw data to subjectively set thresholds or by fitting presumed distributions to available data and evaluating corresponding likelihoods. Scoring approaches are highly sensitive to the choice of anomaly threshold. If the threshold is too high, there is a risk of too many false negatives. Likewise, an anomaly threshold that is too low risks too many false positives.

Non-scoring approaches typically suffer from inadequacy of the presumed statistical distributions such as a Gaussian model that is highly idealized. An accurate estimation of low probability areas (tails of distributions) is of particular importance for anomaly detection because anomalies occur in these regions. In most cases, accurate predictions about the tails are not possible in the state of the art because extreme data points are rare, which causes estimation of any presumed distribution to be dominated by normal data that is of less importance to anomaly detection.

BRIEF DESCRIPTION OF THE DRAWINGS

In the drawings:

FIG. 2 is a flow diagram that depicts an example computer process for anomaly score normalization based on peak over threshold (POT) for EVT;

FIG. 4 is a flow diagram that depicts an example computer process to tune density function parameters for anomaly score normalization;

DETAILED DESCRIPTION

Figure 1:
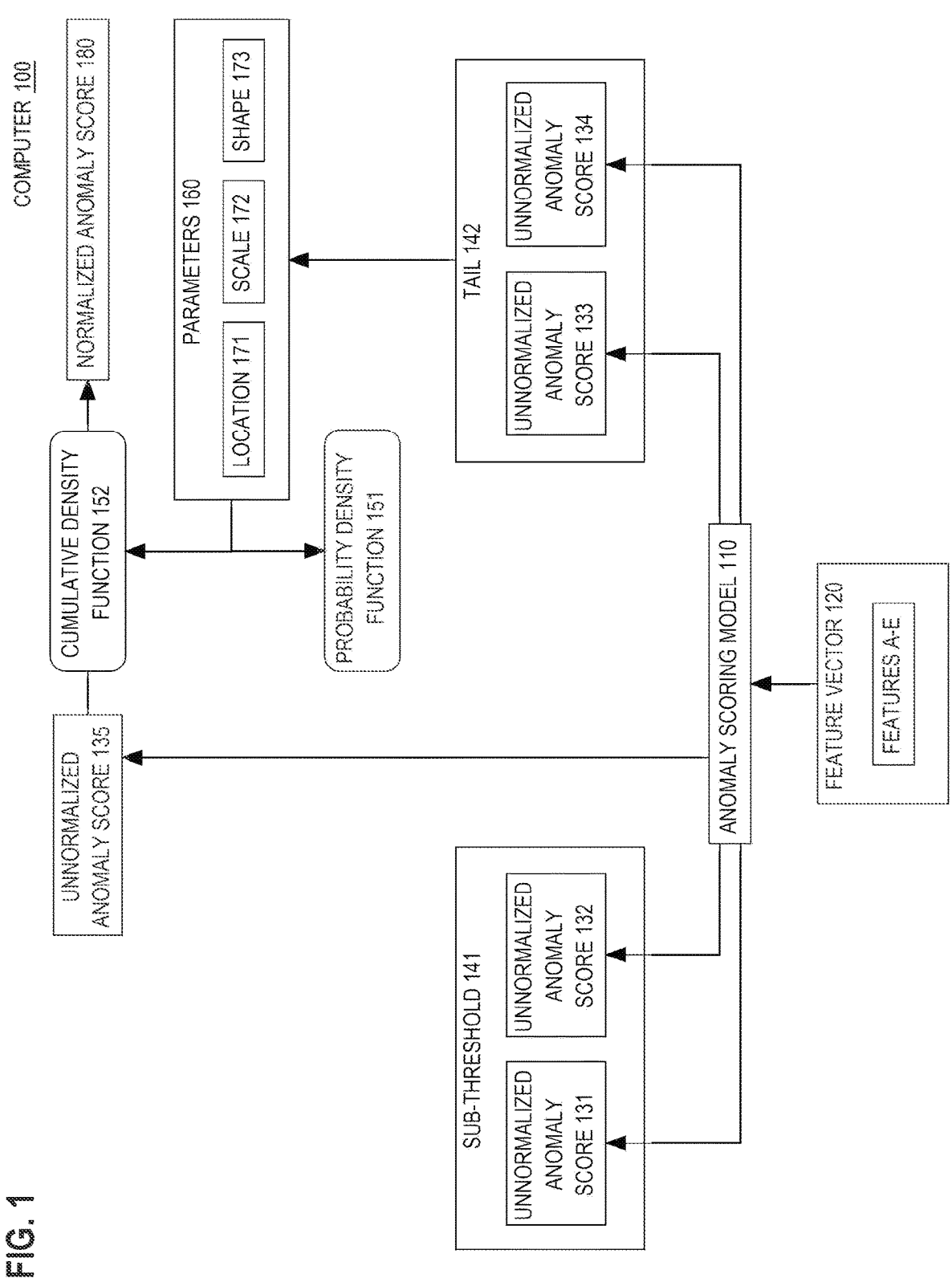
FIG. 1 is a block diagram that depicts an example computer that provides automatic calibration for anomaly detection based on machine learning (ML) and extreme value theory (EVT) techniques for normalizing and thresholding anomaly scores without presuming a values distribution.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein is an anomaly detection approach that addresses shortcomings of state of the art calibration. This approach is based on extreme value theory (EVT) that does not require any statistical distributional assumption. Improved selection of an anomaly threshold herein increases anomaly detection accuracy. In an embodiment, this approach is applied to data from database command logs. The presented methodology is however not database specific and can be applied to other types of logs or data.

In an embodiment, an anomaly scoring model learns to reconstruct workloads that represent normal database activity. Input feature vectors corresponding to normal activity result in lower reconstruction errors, and feature vectors representing anomalies instead result in higher reconstruction errors. The reconstruction error is used as a raw anomaly score. The higher the score, the more anomalous is the input. Raw anomaly scores are normalized and then compared with an anomaly detection threshold that is selected using cross-validation. Scores above the threshold are marked as anomalous. Normalization is needed to bring unbounded scores to a unified range, and thus make the selection of an anomaly threshold more reliable and make possible a comparison of different models that produce anomaly scores.

EVT improves analysis of rare events, including modeling an asymptotic distribution of the extreme events without a strong hypothesis on the original statistical distribution. In other words, EVT is more flexible than the state of the art, which increases anomaly detection accuracy. EVT facilitates extrapolation beyond the range of available data, which makes EVT well suited for detection of new and stranger kinds of attacks. In other words, EVT can make anomaly detection somewhat future proof to evolving threats.

Raw (i.e. unnormalized) anomaly scores are used to estimate parameters of an extreme value distribution. Once estimated, the distribution is used to normalize anomaly scores. This approach ensures accurate anomaly scoring for data belonging to the tail of a score distribution.

EVT has not been used in the context of anomaly detection that is based on data collected from application logs, such as database command logs or application console logs.

Log-based data has different statistical properties from data already used for state of the art EVT. Anomaly scores are calculated herein based on a given data source and an autoencoder that is trained to discover and analyze semantics of an application specific log.

Although EVT has already been applied to anomaly detection in a few limited ways, using EVT for anomaly score normalization is novel. This approach uses raw anomaly scores and estimates their tail distribution. An application-specific lower bound of the tail is discovered based on a peak over threshold (POT) technique that isolates all peak raw anomaly scores that lie above a certain base level. Other approaches are not based on POT due to difficulty in choosing an appropriate base threshold. An optimal discovered base threshold and a generalized Pareto distribution (GPD) are combined to model the tail.

ML-based anomaly detection pipelines herein have three main processing stages. A first stage is dedicated to feature extraction in which application logs are translated into numeric feature vectors. In a second stage, an ML model infers raw anomaly scores for the feature vectors. The scoring model may be a variant of an autoencoder such as a variational or denoising autoencoder. The third stage detects anomalies based on anomaly score normalization as taught herein.

During anomaly detection, a raw anomaly score is compared to an optimally selected POT level. If a raw anomaly score is below the level, it is marked as non-anomalous without performing score normalization. Otherwise, a normalized anomaly score is calculated from the raw anomaly score. In other words and according to POT, some anomaly scores are normalized and others are not, which is a novel approach. By definition, most anomaly scores are normal (i.e. non-anomalous). Thus herein, most raw anomaly scores do not need normalization, which accelerates anomaly detection. This acceleration facilitates asymmetric analysis that dedicates more computation to feature vectors that are outliers and less computation to normal feature vectors. A result is better utilization of processing bandwidth in a way that decreases average latency and increases throughput, which are accelerations.

Another quantitative improvement is increased anomaly detection accuracy. Experimentation revealed that optimal EVT completely eliminates false positives without a decrease in the true positive rate. Thus, precision (i.e. positive predictive value, PPV) is increased and the false discovery rate (FDR) is decreased. In other words, there are fewer false alarms, which means that automatic (and manual) overreactions are avoided, which conserves computer resources such as time and space. Thus, increased precision provides further computer acceleration.

There also are qualitative improvements as follows.

Universal anomaly detection threshold: score normalization decreases data variability given that the score values are all mapped to [0, 1] range. This facilitates establishment of a universal anomaly detection threshold and subsequent comparison, based on that universal threshold, of different anomaly scoring models.

Increased robustness: EVT does not require any strong assumptions about the data generating process, application/domain specifics, nor statistical distributions.

Ease of use: generalized and straightforward to automatically apply to data of any application or domain, including console logs, database command logs, and public cloud ecosystems.

Solid mathematical basis: EVT has a rigorous body of mathematical theory.

In an embodiment, a computer receives many unnormalized anomaly scores and, according to peak over threshold (POT), selects a highest subset of the unnormalized anomaly scores that exceed a tail threshold. Based on the highest subset of the unnormalized anomaly scores, parameters of a probability density function are trained according to extreme value theory (EVT). After training and in a production environment, a normalized anomaly score is generated based on an unnormalized anomaly score and the trained parameters of the probability density function. Anomaly detection compares the normalized anomaly score to a universal anomaly threshold.

1.0 Example Computer

FIG. 1 is a block diagram that depicts an example computer 100, in an embodiment. Computer 100 provides automatic calibration for anomaly detection. Computer 100 uses machine learning (ML) and extreme value theory (EVT) techniques for normalizing and thresholding anomaly scores without presuming a values distribution. Computer 100 may be one or more of a rack server such as a blade, a personal computer, a mainframe, a virtual computer, a smartphone, or other computing device.

1.1 Black Box Model

In various embodiments, hosted in memory of computer 100 is anomaly scoring model 110 that may be any software component that accepts feature vector 120 as input. Applying anomaly scoring model 110 to feature vector 120 causes anomaly scoring model 110 to generate an unnormalized numeric anomaly score that measures how unfamiliar, abnormal, or suspicious is feature vector 120. For example, unnormalized anomaly scores 131-135 are generated for different instances of feature vector 120 that encodes features A-E.

Each of features A-E may have a respective semantic and datatype as discussed later herein. Different instances of feature vector 120 may have same or different values for features A-E, which anomaly scoring model 110 analyzes to infer unnormalized anomaly scores 131-135. In various cases, anomaly scoring model 110 may or may not calculate similar or identical unnormalized anomaly scores for dissimilar instances of feature vector 120.

In various embodiments, anomaly scoring model 110 is or is not based on machine learning (ML). In either case, anomaly scoring model 110 may or may not have a black-box architecture that is unknown, opaque, or confusing in a way that more or less precludes direct inspection of the internal operation of anomaly scoring model 110. In an embodiment not shown, anomaly scoring model 110 is hosted in a different computer that is not computer 100, and computer 100 applies techniques herein by remotely using anomaly scoring model 110. For example, computer 100 may send feature vector 120 to anomaly scoring model 110 over a communication network and responsively receive an unnormalized anomaly score over the communication network.

In various embodiments, anomaly scoring model 110 may be an ML model such as k-nearest neighbor (KNN), an isolation forest, a support vector machine (SVM), an autoencoder or other artificial neural network (ANN), a Bayesian network, or a principle component analysis (PCA). If anomaly scoring model 110 is an ML model then, in this example, anomaly scoring model 110 is already trained. Various example ML model architectures and ML training are discussed later herein.

1.2 Feature Engineering

Feature vector 120 contains a respective value for each of features A-E. Each of features A-E has a respective datatype.

For example, features A-B may have a same or different respective datatype. A datatype may variously be: a) a number that is an integer or real, b) a primitive type such as a Boolean or text character that can be readily encoded as a number, c) a sequence of discrete values such as text literals that have a semantic ordering such as months that can be readily encoded into respective numbers that preserve the original ordering, or d) a category that enumerates distinct categorical values that are semantically unordered.

Categories are prone to discontinuities that may or may not seemingly destabilize anomaly scoring model 110 such that different categorical values for a same feature may or may not cause anomaly scoring model 110 to generate very different unnormalized anomaly scores. One categorical feature may be hash encoded into one number in feature vector 120 or n-hot or 1-hot encoded into multiple numbers. For example, 1-hot encoding generates a one for a categorical value that actually occurs in feature vector 120 and also generates a zero for each possible categorical value that did not occur in feature vector 120.

Feature vector 120 may represent various objects in various embodiments. For example, feature vector 120 may be or represent a network packet, a record such as a database table row, a command such as a shell command or a database statement, or a log entry such as a line of text in a console output logfile. Likewise, features A-E may be respective data fields, attributes, or columns that can occur in each object instance. For example, unnormalized anomaly score 135 may indicate whether or not feature vector 120 is anomalous such as based on a threshold. When computer 100 detects an anomaly in a production environment, an alert may be generated to provoke a human or automated security reaction such as terminating a session or network connection, rejecting feature vector 120 from further processing, and/or recording, diverting, and/or alerting feature vector 120 for more intensive manual or automatic inspection and analysis.

1.3 Unnormalized Anomaly Score from Anomaly Scoring Model

Various implementations of anomaly scoring model 110 may generate various respective distributions of unnormalized anomaly scores for a same set of instances of feature vector 120. For example, different instances of anomaly scoring model 110 may respectively have: a) different ranges of possible unnormalized anomaly scores, b) different numeric datatypes for unnormalized anomaly scores, c) different values distributions of anomaly scores, d) different internal architectures, e) a same architecture with different configuration values such as for hyperparameters, and/or f) training with different training corpuses. Due to those factors (a)-(f), different instances of anomaly scoring model 110 are likely to generate different respective unnormalized anomaly scores for a same instance of feature vector 120.

An invariant in any case is that anomalous instances of feature vector 120 have higher unnormalized anomaly scores than non-anomalous instances when the unnormalized anomaly scores are generated by a same instance of anomaly scoring model 110. Thus, an anomaly threshold may separate anomalous instances from non-anomalous instances. Factors (a)-(f) prevent the state of the art for establishing a universal anomaly threshold as a predefined numeric constant that can be used with discrepant instances of anomaly scoring model 110.

The state of the art resorts to heuristics and/or human expert intuition to define an anomaly threshold for an instance of anomaly scoring model 110, which must be repeated for each instance of anomaly scoring model 110 in a way that is fragile and unreliable due to factors (a)-(f). In many cases, the heuristics entail analysis and/or presumptions of values distributions in a training corpus. Computer 100 has novel automation for establishing an anomaly threshold for an instance of anomaly scoring model 110 without analysis and/or presumptions of values distributions in the training corpus. This way is robust despite factors (a)-(f).

1.4 Extreme Value Theory (EVT) and Peak Over Threshold (POT)

This approach entails two complementary techniques that are reliable normalization of anomaly scores based on extreme value theory (EVT) and robust calculation of an anomaly threshold based on reliably normalized anomaly scores. Unnormalized anomaly scores 131-134 may be sorted by ascending value from left to right as shown, such that unnormalized anomaly score 131 is the lowest and unnormalized anomaly score 134 is the highest. Based on that sorting, most unnormalized anomaly scores naturally are low and on the left because anomalies are rare.

Also based on that sorting, a statistical distribution of unnormalized anomaly scores 131-134 is a curve with a top (i.e. statistical mode) near the left and, because anomalies are rare, a long tail on the right. In other words, the curve has positive skew. All unnormalized anomaly scores to the left of the top/mode or near the top/mode are non-anomalous. The tail on the right contains a mix of anomalous and almost anomalous unnormalized anomaly scores.

According to peak over threshold (POT), any unnormalized anomaly score that exceeds a tail threshold is categorized as a member of the tail on the right, shown as tail 142. In an embodiment, tail 142 is a highest quantile, and the tail threshold is the lower bound of that highest quantile. Any unnormalized anomaly score that does not exceed the tail threshold is categorized as a member of sub-threshold 141, which includes all quantiles except tail 142. For example, tail 142 may be a decile, in which case sub-threshold 141 contains nine deciles and 90% of the unnormalized anomaly scores.

Tail 142 should be over-inclusive and the tail threshold should be low enough to include some non-anomalous scores in tail 142. For example, even though unnormalized anomaly score 133 is categorized into tail 142, computer 100 may perform score normalization to detect that unnormalized anomaly score 133 actually is non-anomalous. Optimal calibration by validation is discussed later herein.

1.5 Density Functions

EVT fits probability density function 151 to tail 142 by training parameters 160 as discussed later herein. Reliable normalization of anomaly scores is achieved by either of density functions 151-152 and, in an embodiment explained later herein, cumulative density function 152 may be based on probability density function 151. Either of density functions 151-152 or both may arithmetically use numeric parameters 160.

In an embodiment, probability density function 151 is the following generalized Pareto distribution (GPD), and parameters 160 includes individual parameters 171-173.

$$f(x) = \frac{1}{\sigma}\left(1 + \xi\frac{x-\mu}{\sigma}\right)^{-1/\xi}$$

The following terms have the following meanings in the above GPD.

x is any of unnormalized anomaly scores 131-135.

μ is location 171 in parameters 160.

σ is scale 172 in parameters 160.

ξ is shape 173 in parameters 160.

In an embodiment explained later herein, parameters 171-173 are trained with probability density function 151 and then already-trained parameters 171-173 are reused for the following cumulative density function 152.

$$F(x) = 1 - \left(1 + \xi \frac{x - \mu}{\sigma}\right)^{-1/\xi}$$

In the above cumulative density function 152, f(x) is a normalized anomaly score. For example, x may be unnormalized anomaly score 135, and f(x) may be normalized anomaly score 180.

2.0 Example Anomaly Detection Process Based on Normalization

FIG. 2 is a flow diagram that depicts an example process that an embodiment of computer 100 may perform for anomaly score normalization based on peak over threshold (POT) for extreme value theory (EVT). FIG. 2 is discussed with reference to FIG. 1.

The process of FIG. 2 has two phases. Steps 201-203 train parameters 160, which may occur in a laboratory environment. Steps 204-205 use trained parameters 160 in a production environment.

Step 201 obtains (e.g. receives or generates) a training corpus that contains unnormalized anomaly scores 131-134 that are or were inferred by already-trained anomaly scoring model 110. In an embodiment, step 201 may use anomaly scoring model 110 to generate the training corpus, which consists solely of unnormalized anomaly scores. For example, the training corpus may be a second training corpus that is derived by applying anomaly scoring model 110 to a first training corpus that lacks anomaly scores and consists of tuples such as messages as discussed later herein.

Step 202 sorts unnormalized anomaly scores 131-134 and selects a highest subset of unnormalized anomaly scores that exceed a tail threshold. For example, step 202 defines tail 142 to contain unnormalized anomaly scores 133-134.

Based on tail 142 as the highest subset of unnormalized anomaly scores, step 203 trains parameters 160 in probability density function 151. Step 203 learns values of parameters 171-173 using techniques such as method of moments (MOM), probability weighted moments (PWM), or otherwise as discussed later herein.

Steps 204-205 occur in production after training parameters 160 finishes. Step 204 receives new unnormalized anomaly score 135 such as directly from anomaly scoring model 110 for a new instance of feature vector 120 that may or may not be live such as received in real-time in a stream. Step 204 detects whether or not unnormalized anomaly score 135 exceeds the tail threshold. In other words, step 204 detects: a) whether or not unnormalized anomaly score 135 is within the range of tail 142, which is the same as b) whether or not unnormalized anomaly score 135 is a peak over threshold (POT).

If unnormalized anomaly score 135 does not exceed the tail threshold, then unnormalized anomaly score 135 is not anomalous and will not be normalized, in which case the process of FIG. 2 ceases. Otherwise, unnormalized anomaly score 135 may or may not be anomalous, and step 205 occurs using parameters 160 that step 203 trained.

Unnormalized anomaly score 135 and/or the instance of feature vector 120 may be new and may have not existed during training steps 201-203. Based on unnormalized anomaly score 135, parameters 160, and density function 151 or 152, step 205 generates normalized anomaly score 180 for unnormalized anomaly score 135 as discussed later herein.

In an embodiment, normalized anomaly score 180 from step 205 is compared to a numeric universal anomaly threshold or an anomaly threshold empirically established by cross validation. If the anomaly threshold is exceeded, then computer 100 classifies the new instance of feature vector 120 as anomalous. Computer 100 may react by treating an anomalous instance of feature vector 120 in special ways such as alerting it for human attention, logging it for later intensive analysis, rejecting it and not further processing it, further processing it with heightened security such as fewer privileges, and/or adding it to a training corpus for later retraining of anomaly scoring model 110 and/or parameters 160.

3.0 Example Normalization Process Based on Maximum Likelihood Estimation (MLE)

Figure 3:
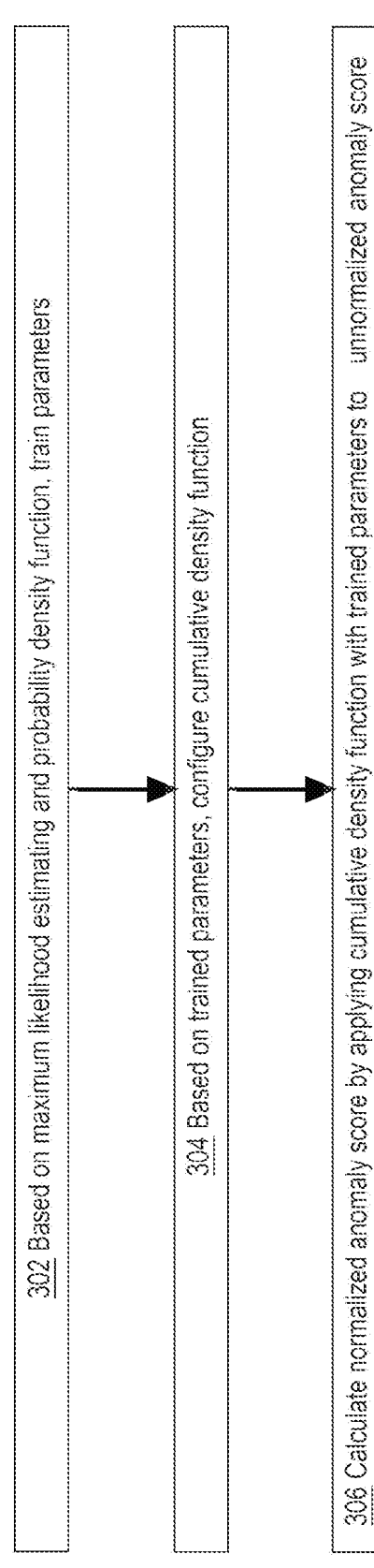
FIG. 3 is a flow diagram that depicts an example computer process for anomaly score normalization based on maximum likelihood estimation (MLE)

FIG. 3 is a flow diagram that depicts an example process that an embodiment of computer 100 may perform for training of anomaly score normalization based on maximum likelihood estimation (MLE). FIG. 3 is discussed with reference to FIG. 1. The steps of the processes of FIGS. 2-3 may be combined or interleaved.

Training step 302 may occur in a laboratory environment. Step 306 uses trained parameters 160 such as in a production environment.

Based on probability density function 151 and the following MLE formula, step 302 trains parameters 171-173 by fitting tail 142 to the following MLE formula.

$$-N_t \log \sigma - \left(1 + \frac{1}{\gamma}\right) \sum_{i=1}^{N_t} \log \left(1 + \frac{\gamma}{\sigma} Y_i\right)$$

The following terms have the following meanings in the above MLE formula.

t is the tail threshold that is the lower bound of the range that defines tail 142.

$N_t$ is a count of peaks over threshold (POT), which are all unnormalized anomaly scores in tail 142.

$Y_i$ is how much does the i-th unnormalized anomaly score in tail 142 exceed tail threshold t.

σ is scale 172 in parameters 160.

γ is well known as the extreme value index.

After step 302, parameters 160 are immutable. Based on trained parameters 160, step 304 configures cumulative density function 152 by using parameters 171-173 as constants.

Step 306 occurs in production after training parameters 160 finishes. Step 306 receives new unnormalized anomaly score 135 such as directly from anomaly scoring model 110 for a new instance of feature vector 120 that may be live such as received in real-time in a stream. Step 306 calculates normalized anomaly score 180 by applying cumulative density function 152 with trained parameters 160 to unnormalized anomaly score 135.

4.0 Example Parameter Tuning Process

FIG. 4 is a flow diagram that depicts an example process that an embodiment of computer 100 may perform to tune parameters 160 for anomaly score normalization. FIG. 4 is discussed with reference to FIG. 1. The steps of the processes of FIGS. 2-4 may be combined or interleaved.

Tuning steps 402 and 404 may occur in a laboratory environment and are iteratively repeated for each of multiple predefined tail thresholds to empirically discover which is an optimal tail threshold. Each iteration performs steps 402 and 404 in sequence with a distinct current tail threshold. Because each iteration is independent, multiple iterations may concurrently occur.

In an embodiment, each of the predefined tail thresholds has a distinct numeric precision. For example, the predefined tail thresholds may be at least two of: 0.9, 0.99, 0.999, and 0.9999.

Based on the current tail threshold, step 402 selects tail 142 as a highest subset of unnormalized anomaly scores and trains parameters 160 of probability density function 151 as discussed earlier herein. Because the current tail threshold is different in each iteration, tail 142 may or may not be different in each iteration. If the current tail threshold is increased in each iteration, then the current tail 142 is a (not necessarily proper) subset of the previous tail 142.

Between steps 402 and 404 in each iteration, parameters 160 are trained based on probability density function 151 and the current tail 142 as discussed earlier herein. Step 404 measures a numeric fitness score of trained parameters 160 for the current tail 142. In various embodiments, step 404 applies a Kolmogorov-Smirnov test, an Anderson-Darling test, or a quantile-quantile (QQ) plot to measure goodness of fit.

After iterating finishes and before step 406, computer 100 detects which tail threshold in which iteration provided the best (e.g. highest) fitness score. Based on detecting which iteration was best, computer 100 selects that iteration's tail threshold and parameters 160 as an optimal configuration for a production environment.

In the production environment, step 406 uses the selected optimal configuration, including the tail threshold and parameters 160, to generate normalized anomaly score 180 from unnormalized anomaly score 135 as discussed earlier herein.

5.0 Example Unnormalized Scoring Process

Figure 5:
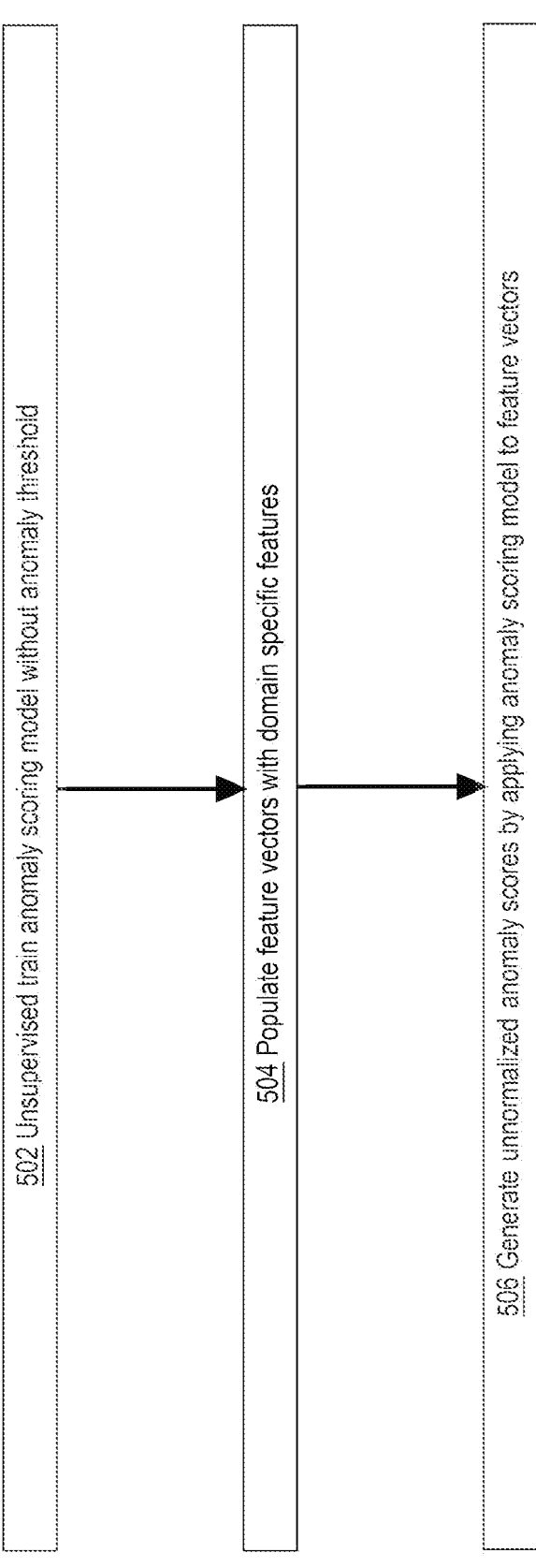
FIG. 5 is a flow diagram that depicts an example computer process to generate a training corpus of unnormalized anomaly scores for training density function parameters.

FIG. 5 is a flow diagram that depicts an exemplary process that an exemplary embodiment of computer 100 may perform to generate a training corpus of unnormalized anomaly scores for training parameters 160. Design choices in this exemplary process and exemplary embodiment are demonstrative and not limitations of embodiments presented earlier herein. FIG. 5 is discussed with reference to FIG. 1. The steps of the processes of FIGS. 2-5 may be combined or interleaved.

As explained earlier herein, unnormalized anomaly scores 131-135 are generated by anomaly scoring model 110. In an embodiment, anomaly scoring model 110 is a trainable regression or other machine learning (ML) model.

Training anomaly scoring model 110 is a first training that occurs during step 502. The process of FIG. 5 occurs before training parameters 160 that is a second training. The first training uses a first training corpus of domain specific tuples as discussed elsewhere herein. The second training uses unnormalized anomaly scores 131-134 as a second training corpus as discussed earlier herein.

In this example, step 502 unsupervised trains anomaly scoring model 110 without an anomaly threshold. Unsupervised training uses a training corpus of tuples that are unlabeled and encoded as instances of feature vector 120. A label is a known correct unnormalized anomaly score for a tuple.

When training anomaly scoring model 110 begins, anomaly scoring model 110 generates unnormalized anomaly scores that are more or less inaccurate. When training finishes, anomaly scoring model 110 generates unnormalized anomaly scores that instead are more or less accurate.

In this example, anomaly scoring model 110 is unsupervised and reconstructive. A reconstructive anomaly scoring model infers two outputs: an unnormalized anomaly score and a regenerated input that is a more or less imperfect copy of the actual/original input.

5.1 Autoencoder

In an embodiment, reconstructive anomaly scoring model 110 is an autoencoder. Backpropagation training of an artificial neural network (ANN) such as an autoencoder as discussed later herein may be driven by model error. With supervised training, model error may be measured by comparing an inference by an ML model to a predefined label that is already established as the correct inference. With unsupervised training, such as with an autoencoder, predefined labels may be unavailable, and error may instead be measured based on diagnostic output from the autoencoder as follows.

In an embodiment, an autoencoder may be a multilayer perceptron (MLP). Unlike anomaly scoring, classification entails associating an inferred label with a complex input. In other words, classification entails recognizing a learned pattern. Anomaly scoring does the opposite, which is recognizing that an input does not match any learned pattern. The input is an instance of feature vector 120.

An autoencoder provides dimensionality reduction, which: a) entails avoiding analysis and integration of irrelevant features of an input, and b) generating a more concise internal neural representation of the input in which only meaningful input features are retained. In other words, an autoencoder extracts semantic details of a complex, noisy, and fuzzy input. Thus, the autoencoder converts a sparse representation of an input into a dense encoding. Features and feature representation are discussed later herein.

Generally during training, an autoencoder learns which features should be deemphasized and how to encode retained semantic features. An autoencoder herein further is a reconstructive model because the autoencoder contains additional neural layers that are trained to regenerate the original input. In other words, the autoencoder encodes input into a semantic coding, which the autoencoder further decodes back into a more or less accurate copy of the input.

In an embodiment, reconstructive anomaly scoring model 110 instead is a principal component analysis (PCA). Although operationally very different from an autoencoder, PCA is a reconstructive model that is functionally similar to an autoencoder as follows. Like an autoencoder, PCA undergoes unsupervised training to learn dimensionality reduction and minimize reconstruction error. Architectures of PCA and autoencoders are discussed later herein.

5.2 Reconstruction Error

A measured difference between the original input and the regenerated input is known as reconstruction error. Because the original input and the regenerated input are composed of individual features A-E, a difference may be measured between an original feature and a reconstructed feature to calculate a respective reconstruction error for that feature. In other words, a respective reconstruction error may be measured for each of features A-E in an instance of feature vector 120. The original and reconstructed values of a feature may be compared to calculate a numeric score that measures a magnitude of a difference between the original and reconstructed values of the feature.

Integration, such as summing or averaging, of respective reconstruction errors of all features A-E may be used to calculate a loss that measures how much relevant information did reconstructive anomaly scoring model 110 lose when inferencing for an input. As discussed below, loss may indicate reconstruction error that occurs in a regenerated input as compared to the original input that is an instance of feature vector 120. Loss is informally or mathematically the opposite of inference accuracy. That is, the higher is loss, the less reliably did reconstructive anomaly scoring model 110 recognize an input. High loss, such as exceeding an anomaly threshold, may indicate that the input is anomalous.

Reconstruction error may be used as a proxy for inference error. Such use of reconstruction error is especially important for unsupervised learning because, without predefined labels, inference error may be more or less impossible to measure. Thus reconstruction error, instead of inference error, may be used for unsupervised learning by a reconstructive model such as for backpropagation for unsupervised training of an autoencoder.

In an embodiment, step 502 has a training threshold that can be used to detect training convergence and causes training of anomaly scoring model 110 to cease when exceeded. In various embodiments, the training threshold is an accuracy threshold or a reconstruction error threshold. The training threshold is not an anomaly threshold for comparison to an unnormalized anomaly score.

5.3 Domain Specific Features

A complex input is provided as an instance of feature vector 120 that contains a respective value for each of all features A-E. In an embodiment, feature vector 120 is homogenous such that respective values of all features are encoded as a same datatype such as a same primitive datatype such as an integer or a unit normalized real number such as floating point. In an embodiment, feature vector 120 is heterogenous, and each feature may have its own respective datatype.

In an embodiment, a sequential feature such as a calendar month may be encoded as a zero or one based unsigned integer such as 1-12 instead of as text strings such as January. In an embodiment, categorical features such as a feature of unordered and mutually exclusive choices such as tea flavors may be so-called one-hot encoded as a group of mutually exclusive Boolean features. For example, one choice from three flavors may be encoded into three Boolean features in which the corresponding feature is true and the two other Boolean features are false in the feature vector. In an embodiment, a Boolean feature is encoded as a number.

Steps 502 and 504 may use a same, partially overlapping, or non-overlapping different training corpuses of tuples. Step 504 populates instances of feature vector 120 with domain specific features. In an embodiment, feature vector 120 is an encoding of a database statement.

For example, features A-E may respectively be: a timestamp of a database statement, an identifier of a database session, a network address of a database client, an identifier of an operating system (OS) of a database client, and at least a portion of a database statement. The following are example features that may occur in tuples that each represent a respective database statement that is live or stored in a log of a database server.

A whole or part of an open database connectivity (ODBC) or Java ODBC (JDBC) uniform resource locator (URL) that was used to establish a network connection and a database session. Example connection string parts include standard URL parts (e.g. protocol, server host, and network port number) and ODBC/JDBC specific parts in the path or query parameters such as a name of a database, schema, or user account.

An indication of how old is the database session that issued the database statement.

A 1-hot encoding of the dialect of structured query processing language (SQL) of the database statement such as data definition language (DDL), data manipulation language (DML), data query language (DQL), and transaction control language (TCL).

A 1-hot encoding of the verb of the database statement such as SELECT, INSERT, DELETE, UPDATE, CREATE, DROP, GRANT, BEGIN, and COMMIT.

An n-hot encoding of the state or context of the database statement such as: outside of a transaction, inside a demarked transaction, auto-committed transaction, and prepared statement.

A return code of the database statement such as an error code.

A count of rows in the result set returned by the database statement.

An n-hot encoding of database tables referenced by a database statement.

A detail of a WHERE clause such as a count of joins specified, a LIMIT clause on results, a sorting direction, and the DISTINCT keyword.

Step 506 generates unnormalized anomaly scores 131-134 by applying anomaly scoring model 110 to instance of feature vector 120 that step 504 provided. Unnormalized anomaly scores 131-134 can be used to train parameters 160 as discussed earlier herein.

6.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, such as Oracle Database 11g. SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, such as with shared access to a set of disk drives and data blocks stored thereon. The nodes in a multi-node database system may be in the form of a group of computers, such as work stations and/or personal computers, that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

6.1 Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
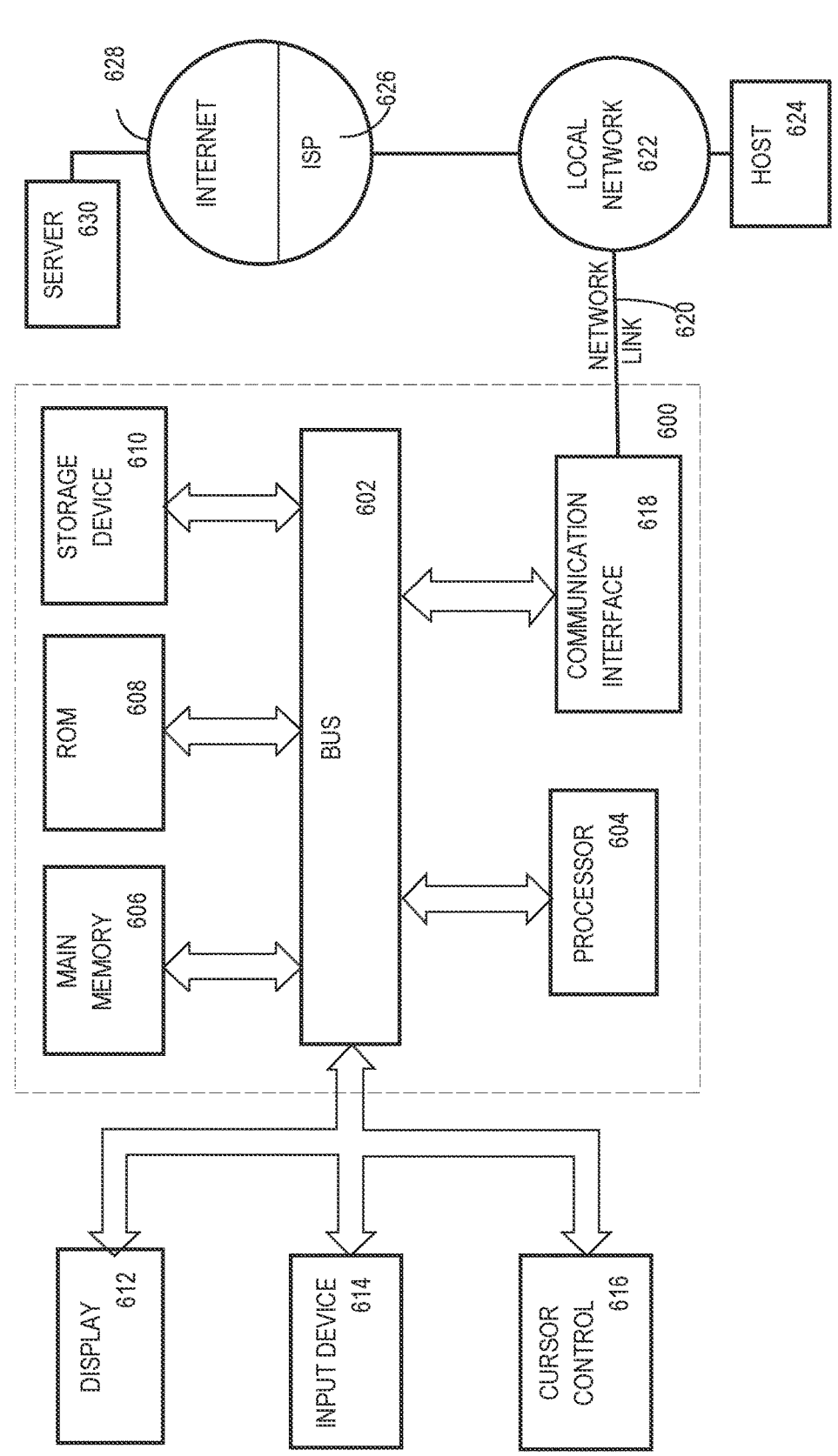
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Software Overview

Figure 7:
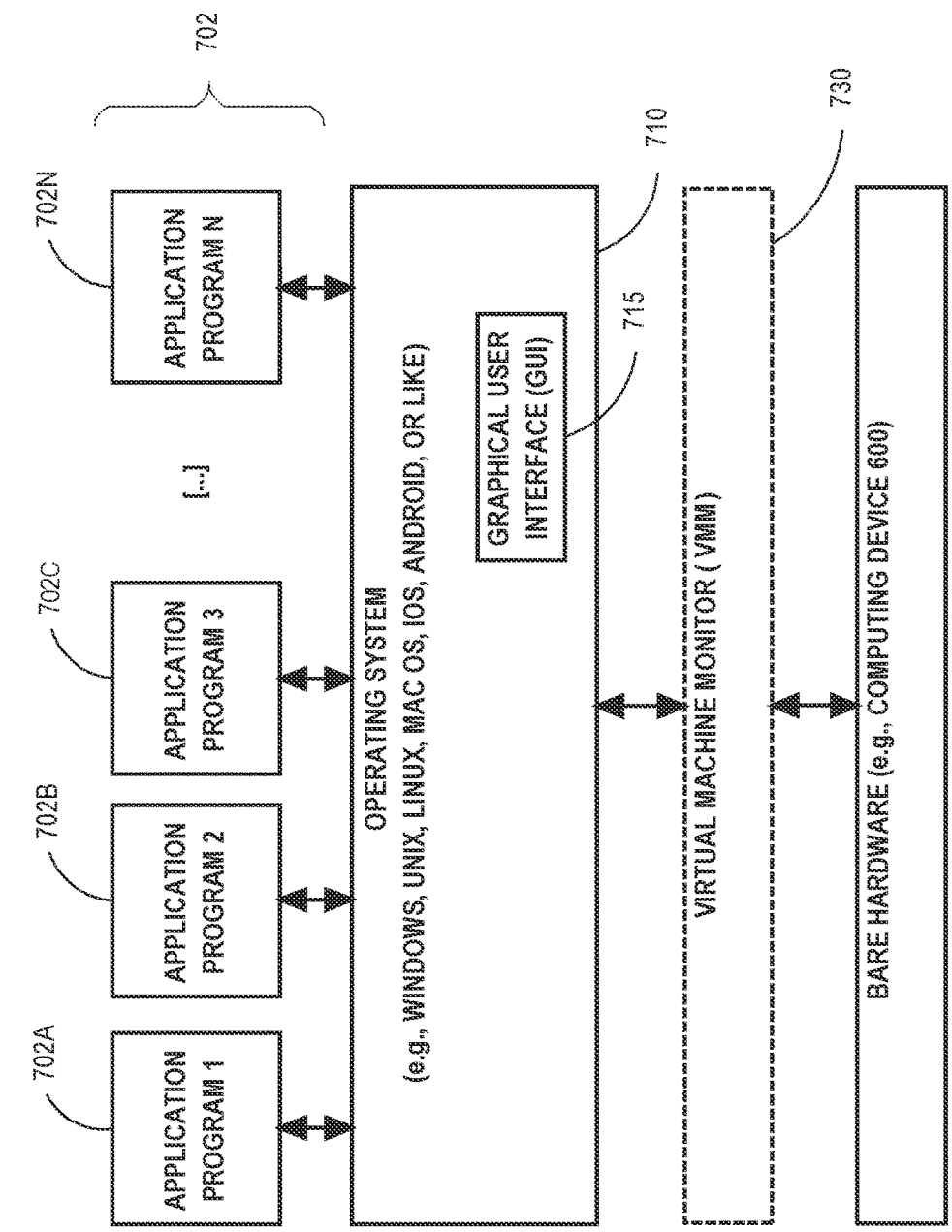
FIG. 7 is a block diagram that illustrates a basic software system that may be employed for controlling the operation of a computing system.

FIG. 7 is a block diagram of a basic software system 700 that may be employed for controlling the operation of computing system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/or serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABIL-ITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving a plurality of unnormalized anomaly scores;
performing for each predefined tail threshold in a plurality of predefined tail thresholds:
   a) selecting a highest subset of the plurality of unnormalized anomaly scores that exceed the predefined tail threshold;
   b) training, based on the highest subset of the plurality of unnormalized anomaly scores, parameters of a probability density function; and
   c) measuring a fitness score of the parameters of the probability density function for the highest subset of the plurality of unnormalized anomaly scores;
generating an unnormalized anomaly score based on a feature vector that contains i) at least a portion of a database statement and ii) at least one selected from the group consisting of: an identifier of a database session, a network address of a database client, and an identifier of an operating system (OS) of a database client;
generating, by the probability density function for the predefined tail threshold with a highest fitness score, a normalized anomaly score from the unnormalized anomaly score; and
detecting, based on the normalized anomaly score, that the database statement is anomalous;

wherein the method is performed by one or more computers.

2. The method of claim 1 wherein:
the method further comprises configuring, based on the parameters of the probability density function, a cumulative density function;
said generating the normalized anomaly score based on the parameters of the probability density function comprises applying the cumulative density function to the unnormalized anomaly score.

3. The method of claim 1 wherein said measuring the fitness score of the parameters of the probability density function comprises applying at least one selected from the group consisting of: a Kolmogorov-Smirnov test, an Anderson-Darling test, and a quantile-quantile (QQ) plot.

4. The method of claim 1 wherein the plurality of predefined tail thresholds consists of at least two selected from the group consisting of 0.9, 0.99, 0.999, and 0.9999.

5. The method of claim 1 wherein each predefined tail threshold of the plurality of predefined tail thresholds has a distinct numeric precision.

6. The method of claim 1 further comprising:
unsupervised training an anomaly scoring model without an anomaly threshold;
said generating the plurality of unnormalized anomaly scores is based on the anomaly scoring model.

7. The method of claim 1 wherein said training the parameters of the probability density function comprises maximum likelihood estimating.

8. The method of claim 1 wherein the probability density function is a generalized Pareto distribution.

9. A method comprising:
receiving a plurality of unnormalized anomaly scores;
selecting a highest subset of the plurality of unnormalized anomaly scores that exceed a tail threshold;
training, based on the highest subset of the plurality of unnormalized anomaly scores, parameters of a probability density function;
first detecting, after said training, whether that a first unnormalized anomaly score for a first database statement does not exceed the tail threshold;
second detecting, in response to said first detecting, that the first database statement is not anomalous;
third detecting, after said training, that a second unnormalized anomaly score for a second database statement exceeds the tail threshold;
generating, in response to said third detecting, a normalized anomaly score based on: the second unnormalized anomaly score and the parameters of the probability density function; and
fourth detecting that the second database statement is anomalous, including detecting that the normalized anomaly score exceeds the tail threshold;
wherein the method is performed by one or more computers.

10. One or more non-transitory computer-readable media storing instructions that, when executed by one or more processors, cause:
receiving a plurality of unnormalized anomaly scores;
performing for each predefined tail threshold in a plurality of predefined tail thresholds:
   a) selecting a highest subset of the plurality of unnormalized anomaly scores that exceed the predefined tail threshold;
   b) training, based on the highest subset of the plurality of unnormalized anomaly scores, parameters of a probability density function; and c) measuring a fitness score of the parameters of the probability density function for the highest subset of the plurality of unnormalized anomaly scores;

generating an unnormalized anomaly score based on a feature vector that contains i) at least a portion of a database statement and ii) at least one selected from the group consisting of: an identifier of a database session, a network address of a database client, and an identifier of an operating system (OS) of a database client;

generating, by the probability density function for the predefined tail threshold with a highest fitness score, a normalized anomaly score from the unnormalized anomaly score; and detecting, based on the normalized anomaly score, that the database statement is anomalous.

11. The one or more non-transitory computer-readable media of claim 10 wherein:

the instructions further cause configuring, based on the parameters of the probability density function, a cumulative density function;

said generating the normalized anomaly score based on the parameters of the probability density function comprises applying the cumulative density function to the unnormalized anomaly score.

12. The one or more non-transitory computer-readable media of claim 10 wherein each predefined tail threshold of the plurality of predefined tail thresholds has a distinct numeric precision.

13. The one or more non-transitory computer-readable media of claim 10 wherein the instructions further cause:

unsupervised training an anomaly scoring model without an anomaly threshold;

said generating the plurality of unnormalized anomaly scores is based on the anomaly scoring model.

14. The one or more non-transitory computer-readable media of claim 10 wherein said training the parameters of the probability density function comprises maximum likelihood estimating.

15. The one or more non-transitory computer-readable media of claim 10 wherein the probability density function is a generalized Pareto distribution.

16. The one or more non-transitory computer-readable media of claim 10 wherein:

the instructions further cause detecting whether the unnormalized anomaly score exceeds the tail threshold;

said generating the normalized anomaly score occurs only when the unnormalized anomaly score exceeds the tail threshold.

17. One or more non-transitory computer-readable media storing instructions that, when executed by one or more processors, cause:

receiving a plurality of unnormalized anomaly scores;

selecting a highest subset of the plurality of unnormalized anomaly scores that exceed a tail threshold;

training, based on the highest subset of the plurality of unnormalized anomaly scores, parameters of a probability density function;

first detecting, after said training, whether that a first unnormalized anomaly score for a first database statement does not exceed the tail threshold;

second detecting, in response to said first detecting, that the first database statement is not anomalous;

third detecting, after said training, that a second unnormalized anomaly score for a second database statement exceeds the tail threshold;

generating, in response to said third detecting, a normalized anomaly score based on: the second unnormalized anomaly score and the parameters of the probability density function; and fourth detecting that the second database statement is anomalous, including detecting that the normalized anomaly score exceeds the tail threshold.

\* \* \* \* \*